United States Patent
Harper et al.

(10) Patent No.: US 8,699,855 B2
(45) Date of Patent: Apr. 15, 2014

(54) USER-SELECTED INTERSTITIAL MEDIA CONTENT RECORDING

(75) Inventors: Leslie Harper, Highlands Ranch, CO (US); John A. Card, II, Denver, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 68 days.

(21) Appl. No.: 12/977,325

(22) Filed: Dec. 23, 2010

(65) Prior Publication Data

US 2012/0163774 A1    Jun. 28, 2012

(51) Int. Cl.
H04N 5/92 (2006.01)

(52) U.S. Cl.
USPC .......................................... 386/249; 386/239

(58) Field of Classification Search
None
See application file for complete search history.

(56) References Cited

U.S. PATENT DOCUMENTS

| | | | |
|---|---|---|---|
| 7,975,062 B2 | 7/2011 | Krikorian et al. | |
| 2002/0015105 A1* | 2/2002 | Abe et al. | 348/460 |
| 2004/0015984 A1* | 1/2004 | Yamamoto et al. | 725/28 |
| 2006/0288291 A1* | 12/2006 | Lee et al. | 715/723 |
| 2007/0288309 A1* | 12/2007 | Haberman et al. | 705/14 |
| 2008/0253586 A1* | 10/2008 | Wei | 381/107 |
| 2010/0061709 A1* | 3/2010 | Agnihotri et al. | 386/124 |
| 2010/0316350 A1* | 12/2010 | Hassell et al. | 386/230 |
| 2012/0059726 A1* | 3/2012 | Kumble | 705/14.69 |

* cited by examiner

Primary Examiner — Huy T Nguyen
Assistant Examiner — Eileen Adams
(74) Attorney, Agent, or Firm — Lowe Graham Jones PLLC (57) ABSTRACT

Presented herein is a method of recording user-selected interstitial media content, such as a television commercial. In the method, a media content stream is presented to a user. The media content stream includes an interstitial segment within a media content segment, such as a television program. In a media content segment listing, such as an electronic program guide, the media content segment is listed, but the interstitial segment is not. While the media content stream is presented, the stream is buffered. During or after the interstitial segment is being presented to the user, a command is received from the user to record the interstitial segment. In response to the command, beginning and ending points of the buffered interstitial segment are identified. The buffered interstitial segment is stored as a persistent recording based on the starting and ending points, and the persistent recording is distinguished from the media content segment.

23 Claims, 7 Drawing Sheets

FIG. 1A

|  | TIME X1 | | TIME X2 | | ... |
|---|---|---|---|---|---|
| CHANNEL A 2 | PROGRAM 101 | | PROGRAM 104 | | ... |
| CHANNEL B 3 | PROGRAM 102 | ... | PROGRAM 105 | | ... |
| ... | | | | | ... |
| CHANNEL C 8 | PROGRAM 103 | | | | ... |
| ... | | | | | ... |

MEDIA CONTENT SEGMENT LISTING 110

TIME SLOTS 114

CHANNEL ID 112

PROGRAM TITLE/ INFO 116

PERSISTENT RECORDING LISTING 400B

| DATE 412 | | TIME LEGNTH 414 |
|---|---|---|
| 11/4 | PROGRAM RECORDING 410 | 30 MINS |
| 11/3 | PROGRAM RECORDING 411 | 2 HRS |
| --- | INTERSTITIAL RECORDINGS FOLDER 422 | --- |
| ... | ... | ... |

SEGMENT TITLE/ INFO 416

FIG. 4B

PERSISTENT RECORDING LISTING 400A

| DATE 412 | | TIME LEGNTH 414 |
|---|---|---|
| 11/4 | PROGRAM RECORDING 410 | 30 MINS |
| 11/3 | PROGRAM RECORDING 411 | 2 HRS |
| 11/3 | INTERSTITIAL RECORDING 420 | 30 SECS |
| ... | ... | ... |

SEGMENT TITLE/ INFO 416

USER-SELECTED INTERSTITIAL MEDIA CONTENT RECORDING

BACKGROUND

Nearly all commercial broadcast radio and television channels present programs, such as movies, entertainment series episodes, news programs, sporting events, and the like, separated by, and possibly interspersed with, short advertisements, commercial messages, or other interstitial segments of content. Typically, the scheduling of these interstitial segments is not known well in advance to the general public. Instead, only the programs are listed in a program listing, or electronic program guide (EPG), that a viewer may access, such as by way of a satellite or cable television receiver, or "set-top box".

Every so often, a viewer may be interested in the content of a commercial being presented or displayed, such as the identity of a product or service, a mailing address of an associated company, a World Wide Web address, a telephone number, or the like, by which a viewer may learn more about the product or service. However, given the brevity of most commercial messages, the viewer may easily miss the desired content of the message. As a result, the viewer may wish to save the content of the commercial for later viewing. To that end, the viewer may record the program that contains the commercial, such as by way of digital video recorder (DVR) functionality resident in the set-top box or a standalone unit. However, when the viewer initiates a recording operation of the current program, the entire program from at least the current time until the scheduled end of the program is normally recorded, requiring the viewer to search through the recorded program to find the commercial of interest. Other program content prior to the commercial may also be recorded. Additionally, if the viewer attempts to retrieve the commercial well after the recording date, the viewer may not remember which recorded program of several such recorded programs stored in the DVR contains the desired commercial.

BRIEF DESCRIPTION OF THE DRAWINGS

Many aspects of the present disclosure may be better understood with reference to the following drawings. The components in the drawings are not necessarily depicted to scale, as emphasis is instead placed upon clear illustration of the principles of the disclosure. Moreover, in the drawings, like reference numerals designate corresponding parts throughout the several views. Also, while several embodiments are described in connection with these drawings, the disclosure is not limited to the embodiments disclosed herein. On the contrary, the intent is to cover all alternatives, modifications, and equivalents.

DETAILED DESCRIPTION

The enclosed drawings and the following description depict specific embodiments of the invention to teach those skilled in the art how to make and use the best mode of the invention. For the purpose of teaching inventive principles, some conventional aspects have been simplified or omitted. Those skilled in the art will appreciate variations of these embodiments that fall within the scope of the invention. Those skilled in the art will also appreciate that the features described below can be combined in various ways to form multiple embodiments of the invention. As a result, the invention is not limited to the specific embodiments described below, but only by the claims and their equivalents.

Figure 1A:
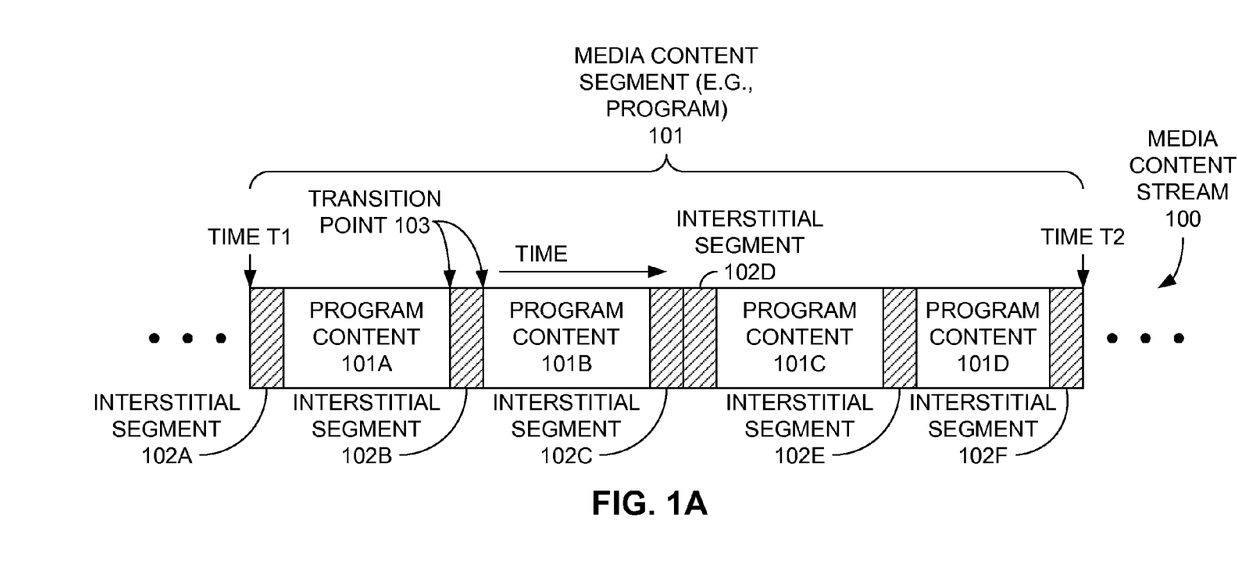
FIG. 1 is graphical depiction of a media content segment transmitted as part of a media content stream according to an embodiment of the invention.

FIG. 1A is a graphical representation of a media content segment 101, such as a television program, movie, sporting event, or news feature, contained in a media content stream 100. Such a stream 100 may be delivered over a broadcast channel of a satellite, cable, or terrestrial ("over-the-air") television or radio network. More generally, any stream of audio and/or visual programming or content transferred over a communications channel, including wired and wireless communication networks, such as the Internet or other wide-area network (WAN), local-area network (LAN), and mobile communications network, may serve as the media content stream 100. Such a content stream 100 may include any combination of audio and visual content.

During the transmission of the media content segment 101, several interstitial media content segments 102A-102F are intermittently presented within the overall presentation of the media content segment 101. A greater or lesser number of interstitial segments 102 may be presented within other media content segments 101 as well. The interstitial segments 102 effectively separate the media content segment 101 into multiple program content portions 101A-101D. Further, the transitions between program content 101 and interstitial segments 102 may be termed transition points 103. The interstitial segments 102 may be, but are not limited to, commercials for products and/or services available to the public, public service announcements (PSAs), media outlet promotional segments, and station identification segments. Many of these interstitial segments 102 may possess a length of a few seconds or minutes, although shorter or longer interstitial segments 102 may be involved in the various implementations discussed hereinafter.

Figure 1B:
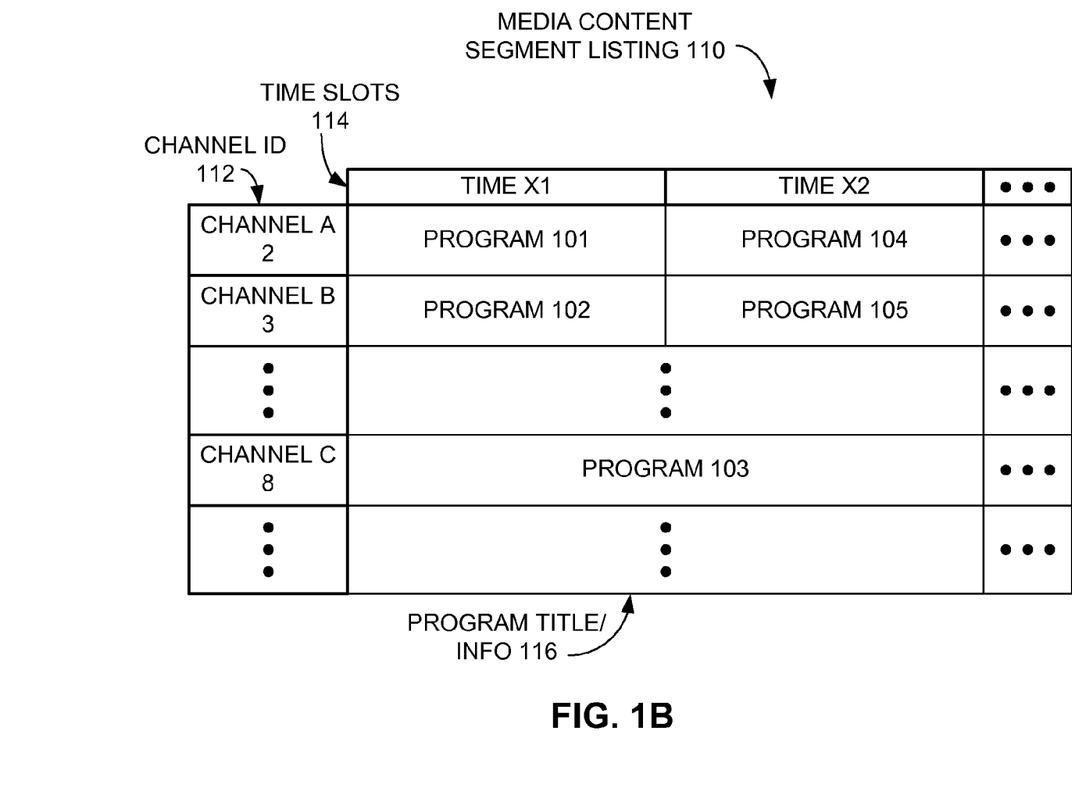
FIG. 1B is a graphical depiction of a media content segment listing according to an embodiment of the invention.

Generally, the timing of the encompassing media content segment 101 within the media content stream 100 is known and widely publicized in advance of the actual broadcast or transmission of the media content segment 101. This timing may be made available in printed publications or in electronic media. One example of an electronic publication of a media content broadcast or transmission scheduled is shown in FIG. 1B, which depicts a media content segment listing 110. One example of the listing 110 is an electronic program guide (EPG) often provided via a display device to users of satellite, cable, and terrestrial receivers or set-top boxes to alert the users to upcoming programs or other media events. In this case, the media content segment listing 110 lists an upcoming showing of the program 101 of FIG. 1A, along with other programs 102-105. Each program 101-105 may be identified by way of a program title 116 or other related identifying information. Each program 101-105 may be organized in the listing 110 according to the channel on which the program 101-105 is to be presented, along with its associated presentation time. In the specific example of FIG. 1B, the program title 116 for each program 101-105 is presented in a grid or array, with each row of the listing 110 being associated with a particular channel by way of a channel identifier 112, such as a channel number, call letters, network name, or the like. The titles 116 are further organized along columns according to the time slot or slots 114 during which the program 101-105 is to be transmitted. As depicted in the listing 110, the first program 101 is broadcast on Channel A from time X1 to time X2, and the fourth program 104 is shown immediately thereafter on the same channel. The third program 103 is transmitted on Channel C from time X1, through the X2 time slot 114. Further, many listings 110 are searchable by way of text strings or other means so that a user can determine when and on which channel a particular program 101-105 of interest is to be presented.

Typically, while the program media content segments or programs 101 are provided in the media content segment listing 110, the interstitial segments 102 presented within the program 101 are not noted or listed in such a program listing 110. Generally, the scheduling of the interstitial segments 102 is not known to the general public. As a result, the user or viewer that finds a particular interstitial segment 102 of interest is not cognizant of the presentation of the interstitial segment 102 until presentation of the segment 102 has already begun.

Figure 2:
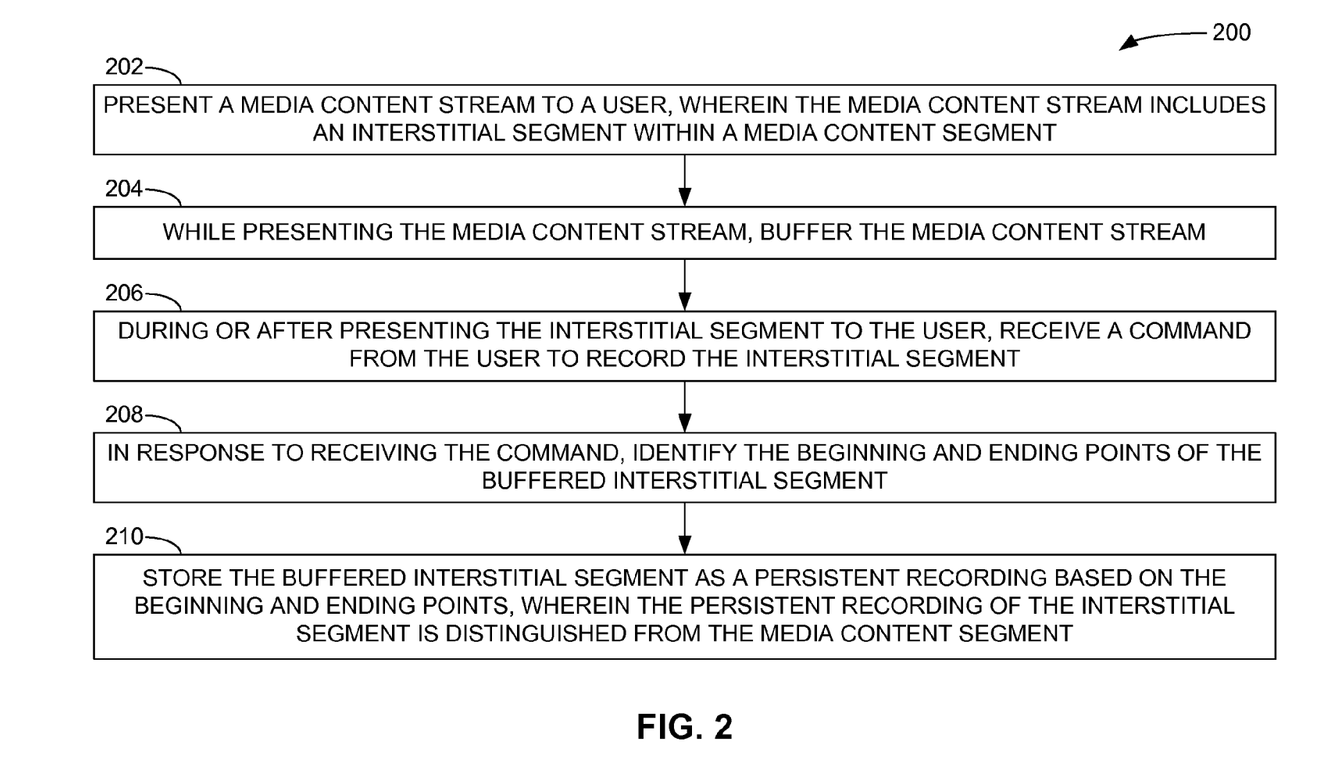
FIG. 2 is a flow diagram of a method according to an embodiment of the invention of recording user-selected interstitial media content.

FIG. 2 presents a method 200 of recording user-selected interstitial media content according to an embodiment of the invention. In the method 200, using FIGS. 1A and 1B for reference, the media content stream 100 is presented to the user, wherein the stream 100 includes at least one interstitial segment 102 within a media content segment 101 (operation 202). As portrayed in FIG. 1B, the media content segment 101 is identified in the media content segment listing 110 available to a user, whereas the interstitial segment 102 is not. While presenting the media content stream 100, the stream 100 is buffered (operation 204). In one example, a device that provides DVR functionality is capable of performing buffering of the content stream 100 for facilitating both "trick modes" (such as fast forward, reverse, pause, and so forth) and persistent recordings of portions of the content 100. During or after the presentation of the interstitial segment 102 to the user, a command is received from the user to record the interstitial segment (operation 206). In response to receiving the command, the beginning and ending points of the buffered interstitial segment 102 are identified (operation 208). The buffered interstitial segment 102 is stored as a persistent recording based on the identified beginning and ending points, wherein the persistent recording of the interstitial segment 102 is distinguished from the media content segment 101 (operation 210). As is described more completely below, examples of distinguishing the persistent recording of the interstitial segment 102 may include, for example, providing a unique title or label for the persistent recording, and logically storing the persistent recording in a separate logical area, such as a folder, from an area employed for media content segments 101.

While the operations of FIG. 2 are depicted as being executed in a particular order, other orders of execution, including concurrent or overlapping execution of two or more implied or explicit operations, may be possible. For example, the presenting operation (operation 202) and the buffering operation (operation 204) may be performed concurrently or simultaneously. In another embodiment, a non-transitory computer-readable storage medium, such as semiconductor memory, a magnetic disk drive, or the like, may have encoded thereon instructions for a processor or other control circuitry of a media content receiver or other electronic device, to implement the method 200.

As a result of employing the method 200, a user is able to record an interstitial segment, such as a commercial of interest, after the commercial has begun, or has even ended, without recording extraneous portions of the encompassing media content segment. Further, since the user is able to distinguish the resulting persistent recording from recordings of media content segments, the user is able to easily identify and access the persistent recording of the interstitial segment. Additional advantages may be recognized from the various implementations of the invention discussed in greater detail below.

Figure 3:
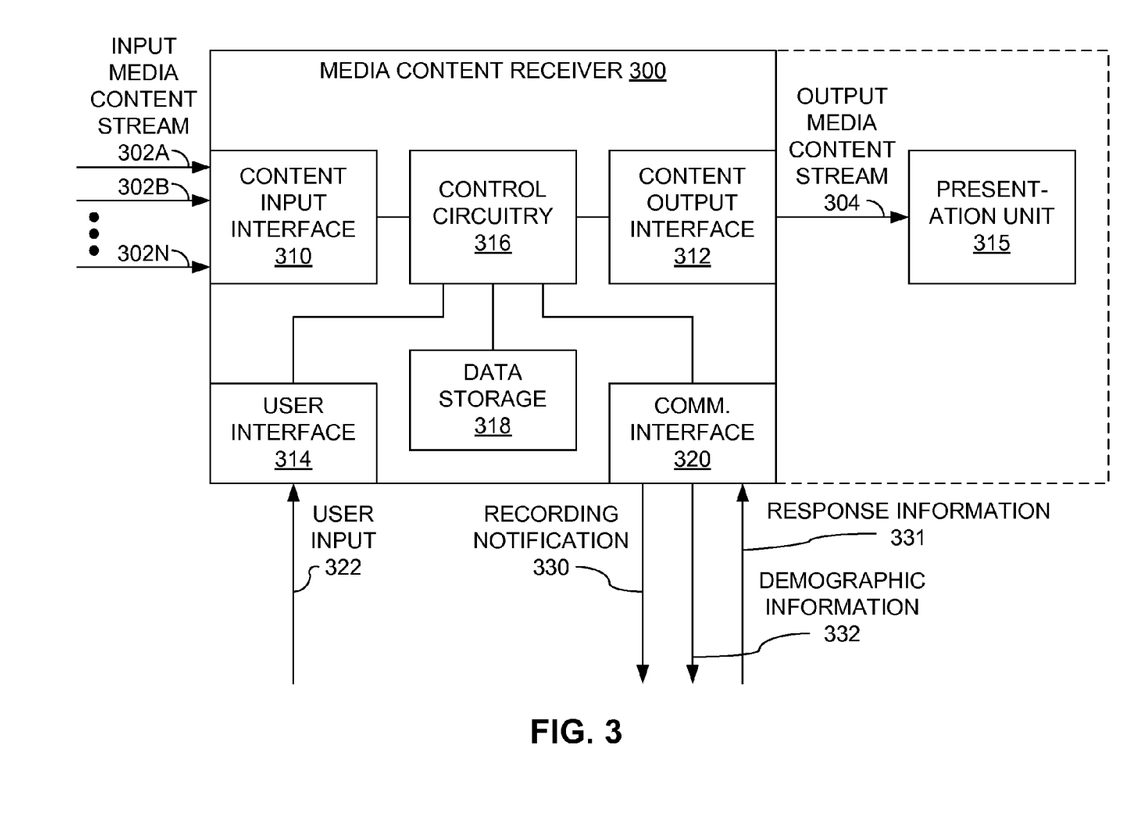
FIG. 3 is a block diagram of a media content receiver according to an embodiment of the invention.

FIG. 3 is a block diagram of a media content receiver 300 according to one embodiment of the invention. The media content receiver 300 may be any device configured to receive and process a media content stream, such as the content media stream 101 of FIG. 1A, for presentation to a user or viewer. Examples of the media content receiver 300 include, but are not limited to, satellite, cable, and terrestrial television receivers or set-top boxes, televisions, satellite and terrestrial radio receivers, digital video recorder (DVR) units, desktop and laptop computers, and mobile communication devices, such as cellular phones, personal digital assistants (PDAs), and so on. The media content receiver 300 may include an output device, such as a visual display and/or audio-generating hardware, for presenting media content to a user, or may be configured to communicate with such components for presentation purposes.

As shown in FIG. 3, the media content receiver 300 includes a content input interface 310, a content output interface 312, a user interface 314, control circuitry 316, and data storage 318. The media content receiver 300 may also include a communication interface 320 in some implementations. Further, the media content receiver 300 may incorporate a presentation unit 315 for presenting media content to a user, or may be coupled to such a device. Other components, such as a power supply or a "smart card" removable memory device interface, may also be included in the media content receiver 300, but are not described further herein to simplify and focus the following discussion. Other devices, such as a satellite or terrestrial antenna and associated signal conversion circuitry, may be coupled with the receiver 300 to receive the media content streams described below, but such devices are not discussed in detail hereinafter.

The content input interface 310 receives one or more media content streams 302A-302N, such as broadcast television programming streams received via separate programming channels. Each of these streams 302 may be represented by the media content stream 100 presented in FIG. 1A. In the case of a satellite television receiver, the content input interface 310 receives the content 302 via an antenna/LNB (low-noise block-converter) combination that receives, down-converts, and forwards the content 302 to the content input interface 310, typically via a coaxial cable. The content input interface 310 may include one or more tuners for selecting particular programming channels carrying the incoming content streams 302 for forwarding via the content output interface 312 to the presentation unit 315, such as a television, video monitor, and/or audio amplifier with speakers. The content input interface 310 may also perform any decryption, decoding, and similar processing of the received content streams 302 required to place the content streams 302 in a format usable by the content output interface 312. In one example, the video may be formatted according to one of the Motion Picture Experts Group (MPEG) formats, such as MPEG-2 or MPEG-4, while the audio may be formatted according to MPEG or Dolby Digital 5.1 (also referred to as AC-3). Other audio/video content format standards may be utilized in other embodiments.

The content output interface 312 provides at least one of the media content streams 302 as an output media content stream 304 to the television or other presentation unit 315 connected thereto. To that end, the content output interface 312 may encode the output media content 304 in accordance with one or more output formats. For example, the content output interface 312 may format the output media content stream 304 for one or more of an analog composite or component video connection with associated audio connection, a modulated radio frequency (RF) connection, and a High Definition Multimedia Interface (HDMI) connection. Other possibilities for the content output interface 312 include, but are not limited to, Ethernet and Universal Serial Bus (USB).

To allow a user to control various functions and aspects of the receiver 300, including the selection of programming channels for viewing, as well as the selection of an interstitial content segment to be recorded, the user interface 314 receives user input 322 for such purposes. In many examples, the user interface 314 may be a remote control interface configured to receive the user input 322 by way of infrared (IR), radio frequency (RF), acoustic, or other wireless signal technologies. To facilitate such information entry, the receiver 300 may provide a menu system or other on-screen display system presented to the user via the presentation unit 315. In some implementations, the user interface 314 may also include any of a keyboard, mouse, and/or other user input device.

The data storage 318 is configured to store at least a portion of one or more of the media content streams 302, including both media content segments 101 and included interstitial segments 102, for delayed playback via the content output interface 312 to the presentation unit 315, as well as buffering for fast forward, rewind, pause, and other transport functionality. Thus, the data storage 518 may operate as a DVR unit incorporated in the receiver 300. Other information, such as electronic program guide (EPG) information and persistent recording metadata, may also be included in the data storage 318. The data storage 318 may include volatile memory, such as static and/or dynamic random-access memory (RAM), and/or nonvolatile memory, such as read-only memory (ROM), flash memory, and magnetic or optical disk memory.

The control circuitry 316 is configured to control and/or access other components of the media content receiver 300. The control circuitry 316 may include one or more processors, such as a microprocessor, microcontroller, or digital signal processor (DSP), configured to execute instructions directing the processor to perform the functions discussed more fully hereinafter, such as the generation of a persistent recording of a user-selected interstitial segment 102 presented within a longer media content segment 101. The control circuitry 316 may also include memory or data storage adapted to contain such instructions, or may utilize the data storage 318 for that purpose. The memory may also include other data to aid the control circuitry 316 in performing the tasks more particularly described below. In another implementation, the control circuitry 316 may be strictly hardware-based logic, or may include a combination of hardware, firmware, and/or software elements.

In some implementations, the media content receiver 300 may include a communication interface 320 configured to transmit recording notifications 330, and possibly demographic information 332, and receive response information 331 associated with a user-selected persistent recording of an interstitial segment 102 with a separate communication node, as is described more fully below. The communication interface 320 may employ any of a number of communication technologies for transmission and reception of information, including both wired and wireless varieties. For example, the communication interface 320 may be an Ethernet, Wi-Fi (IEEE 802.11x), Bluetooth®, or HomePlug® interface for connecting with an Internet gateway device, or with another receiver 300 located nearby. In another implementation, the communication interface 320 may employ a direct connection to a broadband connection for receiving and transmitting the information 330 via the Internet.

In the examples to follow, the input media content stream 302 generally includes both video data and audio data, possibly along with some text data and/or other "metadata", which may describe various aspects of, or provide additional information regarding, the input stream 302. The video data may include an ongoing series of still video images, or "frames", that provide a moving image when presented in sequence. Furthermore, the frames may be presented in an uncompressed format, or in a compressed format, such as one of the MPEG formats, including MPEG-2 or MPEG-4. Similarly, the audio data may include a series of audio samples for presentation to the user in sequence.

The control circuitry 316 of the media content receiver 300 is configured to present at least one of the media content streams 302 received via the content input interface 310 to the content output interface 312 for presentation to the user via the presentation unit 315. In one example, the user has selected which of the media contents streams 302 are to be presented via user input 322 received at the user interface 314. In some implementations, more than one of the streams 302 may be presented to the user concurrently, such as in a picture-in-picture (PIP) mode. Additionally, the control circuitry 316 buffers the media content media streams 302 on the data storage 318 so that the viewer may review portions of the streams 302 that have already been presented by way of reverse, fast-forward, and other "trick mode" commands. Typically, the media content stream 302 being presented is buffered in a "first-in, first-out" (FIFO) manner, in which the most recently received media content data replaces the oldest buffered content as the newest content is being received. The amount of a media content stream 302 that may be buffered depends on the resolution of the media content stream 302 being buffered and other factors, but may often range from 30 minutes to two hours of buffered content in many implementations.

Using the media content stream 100 as an example of an input media content stream 302, the media content receiver 300 provides the user of the receiver 300 the ability to record an interstitial segment 102 of a media content stream 100 that is currently being presented, or has just recently been presented, for later viewing by way of a simple user action. Such user action may include the pressing of a special purpose button on a remote control device that transmits commands to the receiver 300 via the user interface. In another example, the user may access a "soft key", or a key whose function may be programmed by the user for a specific purpose. The user may also enter such a command via a menu selection item or some other input means. In some cases, the interstitial segment 102 may be a television commercial or advertisement, although other types of interstitial segments 102, such as network promotional segments, may be selected for persistent recording.

In one embodiment, when the control circuitry 316 receives the command to save a particular interstitial segment 102, the control circuitry 316 presumes that the interstitial segment 102 of interest is currently being presented to the user via the content output interface 312. In response, the control circuitry 316 may peruse the buffer in the data storage 318, starting from the most recently buffered content and progressing back in time, to find the starting transition point 103 of the interstitial segment 102. The control circuitry 316 also analyzes the incoming media content stream 100 as it is being buffered or thereafter to determine the ending transition point 103 of the interstitial segment 102 of interest. Such operations may be undertaken even if the viewer has paused the presentation of the media content stream 100, or is initiating other trick modes, during the interstitial segment 102. Various possible methods for determining the starting and ending points of the interstitial segment 102 are discussed in greater detail below.

In some embodiments, the user may initiate a command after the interstitial segment 102 of interest has been presented to the user, such as during a portion of the media content segment 101. Using FIG. 1A as an example, the user may issue a command while program content 101C is being presented to the user, thus indicating that the most recent interstitial segment 102D should be stored as a persistent recording. In response, the control circuitry 316 may analyze the buffered media content stream 102 beginning from a current position backward to find an ending point and a beginning point of the interstitial segment 102, thus defining the extent of the interstitial segment 102.

In some situations, the control circuitry 316 may be configured to determine whether the current point of the output media content stream 304 being viewed is an interstitial segment 102. To that end, the control circuitry 316 may analyze the media content stream 100 both before and after the current point to find transition points 103. Once found, the control circuitry 316 can determine a time length between these points. If the length is less than some predetermined length, such as two minutes, the control circuitry 316 may determine that the current portion of the media content stream 100 being presented is included within an interstitial segment 102. Otherwise, the control circuitry 316 may determine that the current portion of the stream 100 is between interstitial segments 102 (i.e., during program content 101). In that case, the control circuitry 316 may analyze the content stream 302 for other transitions between program content portions 101 and interstitial segments 102 to find a beginning point and an ending point of an interstitial segment 102 of interest.

Further, in other implementations, the user may choose for persistent recording other interstitial segments 102 located earlier in the stream 100 than the portion of the stream 302 currently being presented to the viewer. In one example, the user may indicate a number, such as by way of a numeric pad of a remote control device, to indicate how many interstitial segments 102 back from the current point in the content stream 100 should be counted to arrive at the interstitial segment 102 of interest. The control circuitry 316 may enforce some limit as to the number of interstitial segments 102 may be counted back from the current portion of the stream 100.

In determining transition points 103 that are beginning points or ending points of interstitial segments 103, several attributes of the media content stream 100 may be employed for such a purpose. In one example, the media content stream 100 may include metadata which associates the interstitial segment 102 with a unique identifier. More specifically, the unique identifier may be present in the metadata of the media content stream 100 for the duration of the segment 102. As a result, the identifier may be employed to detect both the beginning and end of the selected segment 102. In one implementation, the identifier may be a globally-unique identifier (GUID) assigned to each possible content interstitial segment 102 by way of a producer of the segment, by the media content service provider delivering the segment to the receiver 300, or another entity. Such an identifier may be transmitted periodically throughout the interstitial segment 102 so that accurate identification of the beginning and end of the segment 102 within the content stream 100 is possible. Thus, by analyzing the media content stream 100, such as in response to the user command to store a persistent recording of an interstitial segment 102, the control circuitry 316 may detect the transition points 103 of the segment 102 for such a purpose.

In many cases, however, metadata specifically identifying the segment and its beginning and end may not be available in the media content stream 100. Accordingly, the control circuitry 316 may instead employ attributes or characteristics of the video and/or audio data present in the media content stream 100 to determine the starting and ending points of the interstitial segment 102 in the buffered or recorded stream 100. In one implementation, the user may indicate via additional user input 322 the beginning and end of the interstitial segment 102 to be stored as a persistent recording. For example, the user may rewind presentation of the interstitial segment 102 to its beginning, mark the current location as the start of the segment 102, then navigate to the end of the segment 102 and mark that location as such. In response, the control circuitry 316 may employ these user inputs to generate data indicating the beginning and end of the interstitial segment 102 to be recorded.

In another example, the control circuitry 316 may analyze the video data around the current portion of the media content stream 100 being presented to determine the transition points 103 defining the starting and ending points of the interstitial segment 102 of interest. For example, the control circuitry 316 may analyze the video data for a short series of dark video frames, which may indicate transitions between the selected interstitial segment 102 and an adjacent portion of the media content stream 100. Further, the control circuitry 316 may use knowledge regarding the nature of the selected segment 102 to determine or calculate how many frames or seconds separate the beginning and end of the segment 102. In the case of a television commercial, the control circuitry 316 may utilize the fact that most commercials are fifteen seconds, thirty seconds, or sixty seconds in length. As a result, if the control circuitry 316 discovers two series of dark frames thirty seconds apart, the control circuitry 316 may designate the location of the two dark frame series as the start and end of the selected interstitial segment 102.

In another embodiment, the control circuitry 316 may analyze other aspects of the video data in the neighborhood of the current portion of the stream 100 being presented, drawing upon other attributes of the video associated with the type of interstitial segment 102 being selected. For instance, the control circuitry 316 may inspect the stream 100 for changes in video resolution, such as changes between standard definition and high definition content, to detect the beginning and end of a commercial selected for storing as a persistent recording.

In another example, the control circuitry 316 may inspect color tables transmitted periodically as part of the media content stream 100 to detect significant changes in the tables. Generally, in compressed video data, the color tables provide a mapping from one set of colors to a smaller data set that facilitates compression of the video data. Further, a color table may be provided periodically in the media content stream 100 to reflect changes in the overall color scheme of the stream 100. In many cases, an interstitial segment 102, such as a commercial message, will provide a significantly different and consistent set of color tables than what is provided both before and after the interstitial segment 102 in the media content stream 100. The control circuitry 316 may interpret transitions between different sets of color tables close to the unique text as the beginning and end of the user-selected segment 102.

Similarly, the control circuitry 316 may employ the audio portion of the media content stream 100 to ascertain the beginning and end of the selected interstitial segment 102. With respect to commercials, the control circuitry 316 may search for audio samples representing audio silence, which, like short series of dark frames, is typical for short periods of time preceding and following commercials. If a group of silent samples is located in the stream 100 preceding the user-selected interstitial segment 102, and another group is detected following the segment 102, the control circuitry 316 may presume those audio sample groups are located at the beginning and end of the segment 102. Further, if the sample groups are separated by some standard length of time commensurate with commercial duration, such as fifteen or thirty seconds, the control circuitry 316 may possess more confidence that the two sample groups delineate the user-selected interstitial segment 102.

As with video, the format of the audio sample information may change significantly when transitioning from program content 101 to commercial 102, and vice-versa. For example, while much programming may be presented in an advanced audio format, such as Dolby Digital 5.1, many commercials may utilize two-channel stereo audio. The control circuitry 316 may interpret these changes in audio attributes as transitions between the user-selected interstitial segment 102 and the remainder of the media content segment 101.

The control circuitry 316 may exploit other differences in audio between the type of interstitial segment 102 the user has selected for recording and the surrounding portions of the media content segment 101 to determine the extent of the interstitial segment 102. In one example, television commercials and advertisements often exhibit a restricted frequency range that includes stronger mid-range frequency content and less low-frequency and high-frequency content than other forms of media content 100. The control circuitry 316 can utilize such information to determine when the user-selected interstitial segment 102 begins and ends. In other cases, commercials 102 may employ an overall higher volume level than other content proximate to the commercial segment 102 in the media content segment 101, allowing the control circuitry 316 another way of distinguishing between the interstitial segment 102 and the surrounding content 100.

In each of the embodiments described above, the viewer requests storage of a persistent recording of an interstitial segment 102 while viewing an output media content stream 304 that is being buffered and is currently being presented via the presentation unit 315. In an alternative implementation to each of these embodiments, the viewer instead may issue the command while watching a persistent recording of the media content segment 101 containing the interstitial segment 102 of interest residing in the data storage 318. In that case, the control circuitry 316 may determine the beginning and ending points (i.e., transitions points 103) of the interstitial segment 102 as described above by way of analyzing the persistent recording of the media content segment 101 in order to generate a separate persistent recording for the interstitial segment 102.

In response to the determination of the transition points 103 of the interstitial segment 102, the control circuitry 316 causes the interstitial segment 102 to be stored as a persistent recording, as opposed to a temporarily buffered segment, for subsequent viewing by the user. As a result, the user may access this persistent recording through the user interface 314 by way of a listing of persistent recordings provided by way of a menu system presented to the user via the presentation unit 315. The control circuitry 316 may store the buffered content of the interstitial segment 102 as a persistent recording in the data storage 318 in a number of ways. For example, the control circuitry 316 may copy the buffered content of the segment 102 to a separate portion of the data storage 318 reserved for persistent recordings. In another implementation, the control circuitry 316 may mark the buffered content of the interstitial segment 102 as a persistent recording without any copying of the content. Other methods of generating the persistent recording may also be possible.

Figure 4A:
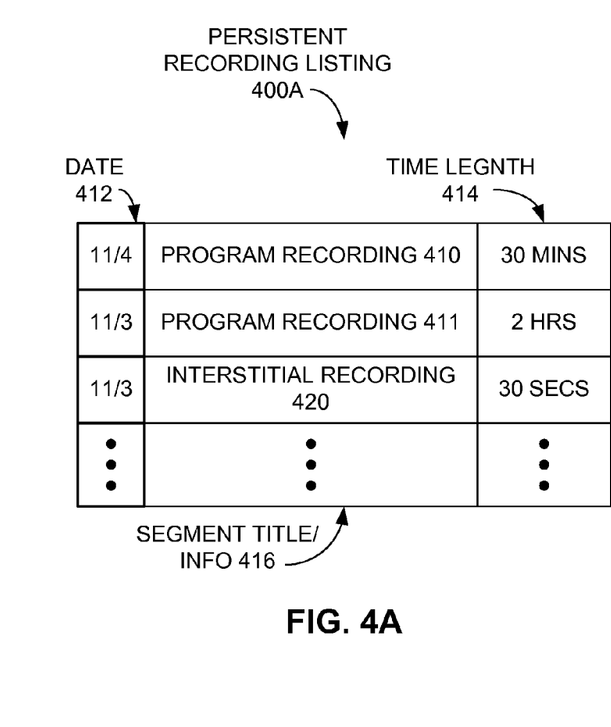
FIG. 4A is graphical depiction of a persistent recording listing according to an embodiment of the invention.

One example of a persistent recording listing 400A including the recording of the interstitial segment 102 is depicted in FIG. 4A. In this example, each persistent recording is identified with a segment title and/or other information 416, and is associated with a recording date 412 and a time length 414. As shown therein, to enhance the ability of the user to identify the recording of the interstitial segment 102, the control circuitry 316 may cause the recording to be listed with a title or label that is distinguished from the media content segment 101 in which the interstitial segment 102 appears. In the example of FIG. 4A, persistent recordings for two media content segments, a first program recording 410 lasting thirty minutes and a second program recording 411 lasting two hours, are listed along with an interstitial recording 420 lasting thirty seconds. In this case, the interstitial recording 420 is labeled or entitled differently from the media content segment 101 in which the interstitial recording 420 is located.

In one implementation, the control circuitry 316 may provide a generic title 416 for the interstitial recording 420 in the persistent recording listing 400A that identifies the interstitial recording 420 as such. Examples of the title 416 may include "Commercial", "Commercial A", or "Commercial 1". Each subsequent interstitial recording 420 may be labeled in some incrementing fashion, such as "Commercial B", "Commercial C", and so on.

In cases in which the interstitial recording 420 includes or is associated with metadata, the control circuitry 316 may include at least portions of the metadata as the title 416 or label for the interstitial recording 420 as presented in the listing 400A. For example, the interstitial recording 420 may include closed-captioning data, such as data formatted according to the EIA-608 standard for NTSC (National Television System Committee) broadcasts and the EIA-708 standard for ATSC (Advanced Television Systems Committee) transmissions. In some implementations, the captioning data may be received over the same channel or stream 302 over which the associated or related audio and video data are received. In other examples, the captioning data associated with the audio/video data may be received over a separate channel, or by way of a separate input connection, such as the communication interface 320. As a result, at least some portion of the closed captioning data may be employed as the title 416 for the interstitial segment 102. More specifically, the control circuitry 316 may employ somewhat unique words in the closed captioning data, such as proper nouns, for the title 416, thus providing a reasonably close relationship between the title 416 and the content of the interstitial recording 420.

In another example, the metadata not related to closed-captioning data may be included in the interstitial recording 420. Such information may include, for example, a product or service name, a manufacturer name, a service provider name, and contact information. In some environments, such information may not be intended for presentation to the user, but the control circuitry 316 may employ at least a portion of the information as a title 116 for the interstitial recording 420.

Figure 4B:
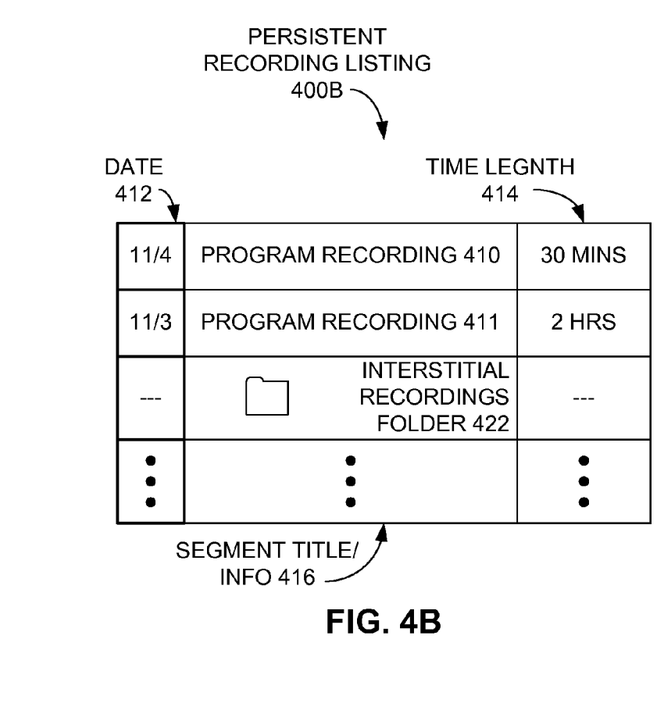
FIG. 4B is graphical depiction of a persistent recording listing according to another embodiment of the invention.

Another example of a persistent recording listing 400B is presented in FIG. 4B. In this scenario, the control circuitry 316 provides a separate interstitial recordings folder 422 through which the user may access the interstitial recording 420, as well as other interstitial recordings. Such an embodiment further separates the program recordings 410, 411 from the interstitial recordings 420, thus facilitating user access to those recordings. The methods discussed above for titling or labeling the interstitial recording 420 may also be employed in other embodiments in relation to the use of folders in FIG. 4B.

Figure 5:
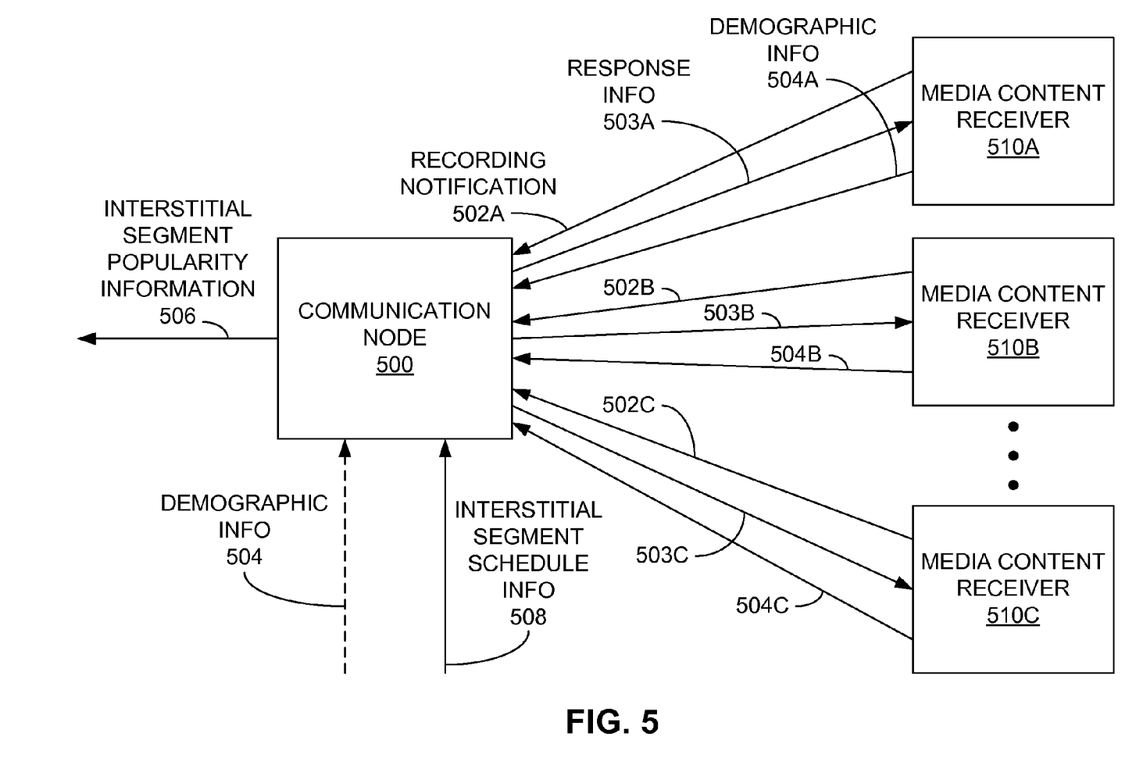
FIG. 5 is a block diagram of multiple media content receivers configured to provide recording notification information to a communication node according to an embodiment of the invention.

In addition to recording an interstitial segment 102 of choice, the control circuitry 316 may provide a notification of the recording 420 to a third-party to provide additional functionality. An example of the use of such a notification is shown in FIG. 5, in which multiple media content receivers 510A, 510B, 510C, each of which may represent an embodiment of the receiver 300 of FIG. 3, are communicatively coupled with a communication node 500. Such communication may be provided in each receiver 500 by way of a communication interface, such as the communication interface 320 of the receiver 300 of FIG. 3. The communication node 500 may be a node provided by the content provider delivering various media content streams to the receivers 510, or may be another entity.

As shown in FIG. 5, one or more recording notifications 502A, 502B, 502C may be transmitted by each receiver 510, with each notification 502 indicating that an interstitial segment 102 has been recorded in the receiver 500 at the request of the user. In one example, the notification 502 may include metadata of the recorded interstitial segment 102 that identifies the segment 102. In another example, the notification 502 indicating when and over which channel the interstitial segment 102 was received, such as by way of a channel number, date, and time.

In addition, each receiver 510A, 510B, 510C may also provide demographic information 504A, 504B, 504C, respectively, possibly reflecting various characteristics of the user associated with the receiver 510, such as age, gender, and the like. In an alternative implementation, the communication node 500 receives the demographic information 504 from a source other than the media content receivers 510, such as an information server provided by the media content provider.

In response to the recording notification 502, each receiver 510 providing a notification 502 may receive response information 503A, 503B, 503C related to the recorded interstitial segment 102 in response to the notification 502. For example, the response information 503 may include detailed information regarding the particular product or service presented in the recorded interstitial segment 102, contact and other information regarding the associated manufacturer or service provider, and information relating to other products or services provided by the manufacturer or service provider. In one implementation, the response information may include audio and/or video content, such as an extended presentation or infomercial, related to the product or service associated with the recorded segment 102. In another example, the entire original interstitial segment 102 may be provided to the receiver 510 that generated the recording notification 502. This particular functionality may aid in situations in which the receiver 510 was not able to record the entire interstitial segment 102 as a persistent recording, such as when the user switches the receiver 510 from one media content stream to the stream in which the interstitial segment 102 of interest is presented, thus preventing the buffering of at least part of the segment 102.

Further, in response to collecting the segment identification information 502, and possibly the demographic information 504, the communication node 500 may generate interstitial segment popularity information 506 and transmit the information 506 to third parties, such as advertisers of products and services portrayed in commercials available in content streams 302 received by the receivers 510.

Figure 6:
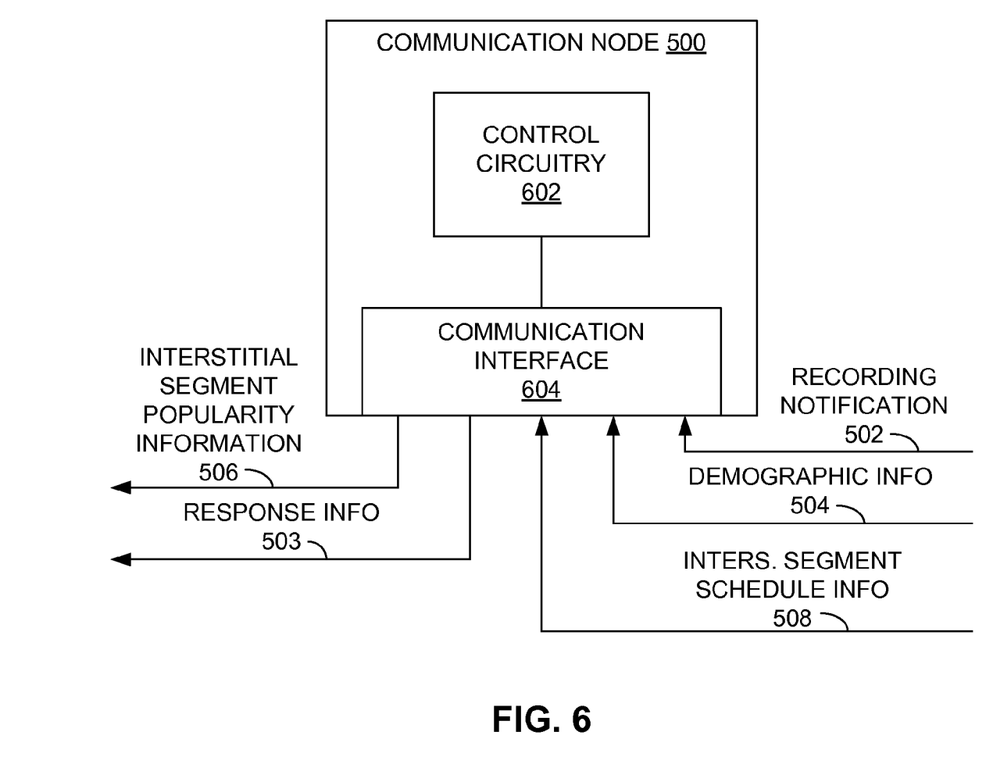
FIG. 6 is a block diagram of the communication node of FIG. 5 according to an embodiment of the invention.

As shown in greater detail in FIG. 6, the communication server or node 500 includes control circuitry 602 and a communication interface 604, which may be similar in functionality to the control circuitry 316 and the communication interface 320 of the receiver 300 of FIG. 3. Other components, such as a user interface, power supply, and the like, may also be included in the communication node 500 but are not discussed further herein. Generally, the communication interface 604 receives the recording notifications 502, and possibly user demographic information 504, from the receivers 510. In another example, the communication interface 604 receives the demographic information 504 from another source, such as a content subscriber database maintained by the service provider of the various content streams 302 that may be received at the receivers 510. The communication interface 604 may also receive interstitial segment scheduling information 508 relating the particular stream 302 or channel, and broadcast date and time, of various interstitial segments 102, such as commercials, station promotional messages, and the like to some identifying information for each of the interstitial segments 102, such as the product, service, or corporate entity involved. Each recorded interstitial segment 102 represented by a recording notification 502 may then be related to some entity for reporting purposes.

More specifically, based on the information received at the communication node 500, the control circuitry 602 of the node 500 may generate interstitial segment popularity information 506, which provides an indication as to which segments are being recorded the most, and also may associate the recorded interstitial segments 102 with specific demographic viewer groups. In the case of commercial segments, such information 506 may be desired by product manufacturers, service providers, marketing firms, rating agencies, and so on to determine which commercials or advertisements are more popular. For providing the popularity information 506 to the advertisers and similar entities, as well as for providing the response information 503 to the receivers 510, the owner or operator of the communication node 500, such as a content service provider, may designate or charge some fee to the entities. This designation may take place within the communication node 500, or within another electronic device or system communicatively coupled thereto in response to receiving the popularity information 506 or some indication of the transmission of the response information 503 from the communication node 500, before being billed to the corresponding entity.

At least some of the embodiments presented above allow a user of a media content receiver, such as a satellite, cable, or terrestrial set-top box, to store one or more interstitial media content segments, such as television commercials, as a persistent recording for subsequent viewing. Further, the persistent recording may be distinguished from other recorded content to aid in the user's access of the recording. A user may then glean more information from the recorded interstitial segment that was difficult to absorb or interpret during the original reception or viewing of the interstitial segment. In addition, the receiver may inform another device, such as a communication server or node, of the recording of the interstitial segment, thus causing the transfer of more information to the receiver that may be of interest to the user. Furthermore, information identifying the recorded segment may be forwarded to a centralized communication node configured to aggregate such information from multiple receivers and process the information to generate an indication of the relative popularity of the interstitial segment.

While several embodiments of the invention have been discussed herein, other implementations encompassed by the scope of the invention are possible. For example, while various embodiments have been described largely within the context of television set-top boxes, the design of other types of media content receivers, such as satellite and terrestrial radios, standalone DVRs, cellular telephones, PDAs, and desktop and laptop computers, that are capable of receiving media content streams with commercials and other interstitial content segments within larger identifiable content segments, such as television episodes, movies, and the like, may employ various aspects of the systems and methods described above to similar effect. In addition, aspects of one embodiment disclosed herein may be combined with those of alternative embodiments to create further implementations of the present invention. Thus, while the present invention has been described in the context of specific embodiments, such descriptions are provided for illustration and not limitation. Accordingly, the proper scope of the present invention is delimited only by the following claims and their equivalents.

What is claimed is:

1. A method of recording user-selected interstitial media content, the method comprising:
   presenting a media content stream to a user, wherein the media content stream includes an interstitial segment within a media content segment, wherein the media content segment is identified in a media content segment listing available to the user, and wherein the interstitial segment is not identified in the media content segment listing;
   while presenting the media content stream, buffering the media content stream;
   during or after presenting the interstitial segment to the user, receiving a command from the user to record the interstitial segment;
   at the time of receiving the command from the user, identifying a starting point and an ending point of the buffered interstitial segment; and
   in response to receiving the command from the user, storing the buffered interstitial segment as a persistent recording based on the starting point and the ending point of the buffered interstitial segment,
   wherein the persistent recording of the interstitial segment is distinguished from the media content segment, and
   wherein the persistent recording of the media content segment is identified in the media content segment listing available to the user.

2. The method of claim 1, wherein:
the persistent recording is distinguished by way of displaying to the user an identifier for the persistent recording of the interstitial segment in an area of a persistent recording listing separate from identifiers for persistent recordings of media content segments listed in the persistent recording listing.

3. The method of claim 1, wherein:
the persistent recording is distinguished by way of providing in a persistent recording listing an identifier of the persistent recording of the interstitial segment that identifies the interstitial segment.

4. The method of claim 1, wherein:
identifying the starting point and the ending point of the interstitial segment comprises analyzing the media content stream for at least one of a video transition between the media content segment and the interstitial segment and an audio transition between the media content segment and the interstitial segment.

5. The method of claim 4, wherein:
the video transition comprises a black portion of video content of the media content stream extending for at least a predetermined time period.

6. The method of claim 4, wherein:
the video transition comprises a change in a color table for video content of the media content stream.

7. The method of claim 4, wherein:
the audio transition comprises audio silence of audio content of the media content stream extending for at least a predetermined time period.

8. The method of claim 4, wherein:
the audio transition comprises a change in audio frequency range of audio content of the media content stream.

9. The method of claim 1, wherein:
the media content stream comprises metadata associated with the interstitial segment; and
identifying the starting point and the ending point of the interstitial segment is based on the metadata associated with the interstitial segment.

10. The method of claim 9, wherein:
the metadata comprises textual data to be presented to the user in conjunction with the interstitial segment.

11. The method of claim 1, wherein:
the media content stream comprises metadata associated with the interstitial segment; and
the persistent recording of the interstitial segment is distinguished in the media segment listing by labeling the persistent recording with at least some of the metadata.

12. The method of claim 1, wherein:
the interstitial segment comprises an advertisement.

13. The method of claim 1, wherein:
the interstitial segment is not identified in the media content segment listing.

14. A media content receiver, comprising:
a content input interface configured to receive multiple channels of media content from a media content source, wherein each of the channels carries a media content stream;
data storage configured to store portions of the media content streams;
a content output interface configured to transmit media content for presentation to a user;
a user interface configured to receive commands from the user; and
control circuitry configured to:
   while transmitting a media content segment of the media content stream carried over a first of the channels for presentation to the user via the content output interface, buffer the media content segment in the data storage, wherein the media content segment comprises an interstitial segment, wherein the media content segment is identified within a media content segment listing available to the user via the user interface, and wherein the interstitial segment is not identified within the media content segment listing;
   during or after buffering the interstitial segment in the data storage, receive a command via the user interface from the user to record the interstitial segment, wherein the command from the user is received at a time of presentation of the interstitial segment to the user; and in response to receiving the command via the user interface from the user, determine the extent of the buffered interstitial segment; and store the buffered interstitial segment in the data storage as a persistent recording as determined by the extent of the buffered interstitial segment, wherein the persistent recording of the interstitial segment is uniquely identified in a persistent recording listing, wherein the persistent recording of the media content segment is identified in the media content segment listing available to the user.

15. The media content receiver of claim 14, wherein:

the media content stream comprises metadata associated with the interstitial segment;

the persistent recording of the interstitial segment comprises the metadata; and the control circuitry is configured to present at least a portion of the metadata to the user via the content output interface.

16. The media content receiver of claim 14, further comprising:

a communication interface;

wherein the control circuitry is configured to transmit a notification of the recording of the interstitial segment via the communication interface to a communication node.

17. The media content receiver of claim 16, wherein:

the control circuitry is configured to transmit demographic information corresponding to the user of the media content receiver to the communication node.

18. The media content receiver of claim 16, wherein:

the control circuitry is configured to receive response information from the communication node via the communication interface in response to the transmission of the notification, and to present the response information to the user via the content output interface, wherein the information is associated with the interstitial segment.

19. The media content receiver of claim 14, wherein:

the interstitial segment is not identified in the media content segment listing.

20. A communication node, comprising:

a communication interface configured to receive input information from a media content receiver and to transmit response information to the media content receiver, wherein the input information identifies an interstitial segment that has been recorded in the media content receiver, wherein the interstitial segment is recorded in response to a command of a user of the media content receiver made during presentation of the interstitial segment to the user, wherein the input information is communicated from the media content receiver to the communication interface in further response to the command of the user of the media content receiver, and wherein the response information is associated with the interstitial segment; and control circuitry configured to process the input information to generate the response information and is configured to communicate the response information to the media content receiver, wherein the interstitial segment comprises an advertisement for a product or service, wherein the response information comprises additional information not provided in the interstitial segment, wherein the additional information is related to the product or service, wherein the media content receiver is configured to generate a media content segment listing that is available to the user that identifies a persistent recording of the media content segment, wherein the interstitial segment in not identified in the media content segment listing, wherein the media content receiver is configured to generate an interstitial segment listing that lists the interstitial segment, and wherein the additional information related to the product or service is presentable to the user.

21. The communication node of claim 20, wherein:

the communication interface is configured to receive demographic information related to the user of the media content receiver; and the control circuitry is configured to associate the demographic information with the input information to ascertain popularity information of the interstitial segment.

22. The communication node of claim 21, wherein:

the control circuitry is configured to designate a fee to be charged to a provider of the product or service in response to at least one of receiving the input information and generating the popularity information.

23. The communication node of claim 21, wherein:

the control circuitry is configured to transmit an indication of at least one of the input information and the popularity information to a separate communication node via the communication interface.

* * * * *

UNITED STATES PATENT AND TRADEMARK OFFICE
CERTIFICATE OF CORRECTION

PATENT NO.        : 8,699,855 B2                                                              Page 1 of 1
APPLICATION NO.   : 12/977325
DATED             : April 15, 2014
INVENTOR(S)       : Harper et al.

It is certified that error appears in the above-identified patent and that said Letters Patent is hereby corrected as shown below:

In the Claims

In Claim 20, Column 16, Line 25, after the word "segment," please replace "in" with --is--.

Signed and Sealed this
Tenth Day of February, 2015

Michelle K. Lee
*Deputy Director of the United States Patent and Trademark Office*